US005896638A

United States Patent [19]

Kamysiak

[11] Patent Number: 5,896,638

[45] Date of Patent: Apr. 27, 1999

[54] DECORATION MAKING SYSTEM

[76] Inventor: Jerry Kamysiak, 9528 Bolton Rd., Posen, Mich. 49776

[21] Appl. No.: 08/897,266

[22] Filed: Jul. 21, 1997

[51] Int. Cl.$^6$ .......... B23P 11/00

[52] U.S. Cl. .......... 29/243.56; 72/117

[58] Field of Search .......... 29/243.5, 243.56, 29/243.57; 72/141, 117, 106, 123; 428/10, 27

[56] References Cited

U.S. PATENT DOCUMENTS 5,247,729 9/1993 Carmichael .......... 29/243.5

*Primary Examiner*—P. W. Echols
*Assistant Examiner*—John Hong
*Attorney, Agent, or Firm*—Our Pal® Asija

[57] ABSTRACT

The system of this invention comprises a clamping machine and a wire frame operand for making all types of decorations. The wire frame with plurality of U shaped clips can be in such shapes as wreath circle, heart, swag, candy cane and the like. The Machine comprises a handle a pair of jaw members, one in the shape of a C and another in the shape of an F, a spring, and a means for anchoring said machine to a convenient working surface. A decoration is made by aligning each U clip of the frame between said pair of jaws and then placing some greens or other decorative twigs with stem along the rigid wire of the frame and then pulling the handle which closes the U clip by cam action of said pair of jaws.

7 Claims, 6 Drawing Sheets

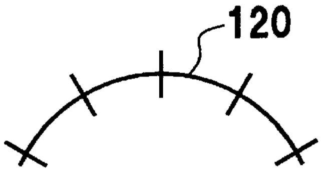
Fig 6(a)
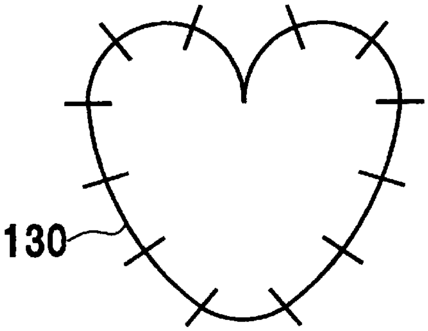
Fig 6(b)
Fig 6(c)
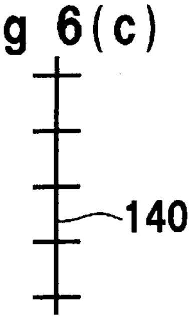
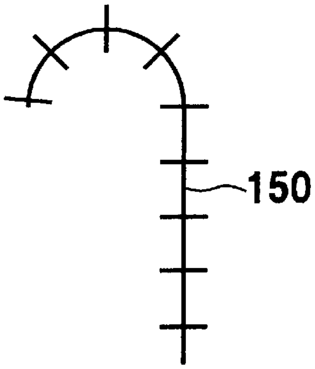
Fig 6(d)
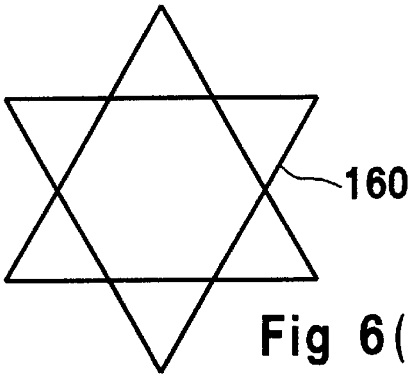
Fig 6(e)
Fig 6(f)

DECORATION MAKING SYSTEM

This invention relates to decoration making machines. Moreparticularly it relates to a hand operated machine for making decorations from evergreens, Christmas greens, dried, preserved or silk flowers, corn husks and aesthetic twigs (almost anything with a stem) etc in the shape of wreath rings, hearts, mantel pieces, swags, arches and the like home and office decor items.

THE PROBLEM

The problem with prior art decor making machines is that they are bulky, complex, cumbersome, expensive and hand-wrapping in particular is time consuming. Although such machines may be affordable and suitable for merchants and manufacturers of decorations, they are neither affordable nor suitable for the occasional Do-It-Yourself home and office user and consumer. This invention solves this problem by providing a simple elegant machine for making home decor for the occasional user. Clamp rings made of low carbon steel are hard to bend but stay closed when bent. Clamp rings can be made form soft wire, then manually hand bent by a hammer, but they relax and open back up or loosen so filler materials either fall out or droop reducing the eye appeal. This invention eliminates hand wrapped crimped rings, foot pedal and hammering the clamps afterward etc.

SUMMARY

The system of this invention comprises two parts. One part "the operand" is a decor frame such shapes as wreath circle, heart, swag, candy cane and the like. The second part is a decor machine with moving parts which acts upon said decor frame. The decor frame comprises a shaped rigid wire with a plurality of U shaped clips. The Machine comprises a handle a pair of jaw members, one in the shape of a C and another in the shape of an F. a spring, and a means for anchoring said machine to a convenient working surface. A decoration is made by aligning each U clip of the frame between said pair of jaws and then placing some greens or other decorative twigs with stem along the rigid wire of the frame and then pulling the handle which closes the U clip by cam action of said pair of jaws.

PRIOR ART

A preliminary limited prior art search was conducted and furthermore the inventor is intimately familiar with the prior art. Following are typical examples of the prior art known to the inventor or his attorney arranged in the reverse chronological order for ready reference of the examiner and the reader.

a) U.S. Utility Pat. No. 5,161,292 awarded to Kurtyak et al on Nov. 10, 1992 for "Rail Anchor Wrench"

b) U.S. Utility Pat. No. 4,802,271 granted to Richard Bader on Feb. 7, 1989 for "Wreath making Machine"

c) U.S. Utility Pat. No. 4,100,716 earned by Angel Barroso on Jul. 18, 1978 for "Clamping Machine"

d) U.S. Utility Pat. No. 3,914,980 bestowed upon Herbert Niedecker on Oct. 28, 1975 for "Plier-Like Device for Closing of Packing Wrappers"

e) U.S. Utility Pat. No. 3,810,495 issued to Kenneth Pack on May 14, 1974 for "Automatic Stapling System"

f) U.S. Utility Pat. No. 2,735,322 honorably given to Sidney Meisler on Feb. 21, 1956 for "Pivoted Handtool for Compressing Clips Around Flanges"

g) U.S. Utility Pat. No. 1,809,386 blessed upon William Mason on Jun. 9, 1931 for "Fence Fastener Tool"

h) German Patent (Pataentschrift) 629,830 dated May 13,1936.

Unfortunately none of the prior art devices singly or even in combination provide all of the features and objectives established by the inventor for this system as enumerated below.

OBJECTIVES

1. It is an objective of this invention to provide method, devices and system for making decorations from christmas greens, dried, preserved or silk flowers, corn husks and aesthetic twigs etc in the shape of wreath rings, hearts, mantel pieces, swags, arches and the like home and office decor items conveniently, quickly and affordably.

2. Another objective of this invention is to provide a decor maker which is suitable for an occasional "DO-It-Yourself" user and consumer 3. Another objective of this invention is that it use little or no additional energy.

4. Another objective of this invention is that it is easy to use by people of small or weak stature.

5. Another objective of this invention is that its use be intuitive that requires little additional training.

6. Another objective of this invention is that it be physically safe in normal environment as well as accidental situations.

7. Another objective of this invention is that it be environmentally friendly and safe and made from bio-degradable materials to the extent practical.

8. Another objective of this invention is that it meet all federal, state, local and other private standards, guidelines and recommendations with respect to safety, environment, quality and energy consumption.

9. Another objective of this invention is that it prevent waste conserve greens and other decorative materials with stems used in making decorations.

10. Another objective of this invention is that it be made of modular units easily interfaceable to each other.

11. Another objective of this invention is that the decorations made with this system are long lasting such that the filler materials do not become loose once properly clamped.

12. Another objective of this invention is that the machine is suitable for frames of all types of shapes including circles, ovals, hearts, arches, stars, garlands, letters, slogans, logos, designs symbols and the like.

13. Another objective of this machines that its suitable for all types of filler materials including all types evergreens, dried, preserved or silk flowers, corn husks, decorative twigs or almost anything decorative but non-fragile with a stem.

14. Another objective of this invention is that it obviates tedious hand wrapping and foam wreaths.

15. Another objective of this invention is that it be easy to install, de-install, transport and store.

16. Another objective of this invention is that it can be used on any surface almost anywhere even in the field where greens are readily and abundantly available.

17. Another objective of this invention is that it be capable of making decorations suitable for any and all season and year round.

18. Another objective of this invention is that it can be used for making decorations for fun and profit.

19. Another objective of this invention is that process of making decorations with the machine of this invention is enjoyable.

20. Another objective of this invention is that decorations made with this machine be of high quality with high aesthetic eye appeal.

21. Another objective of this invention is that the two prongs of the U clip close one at a time to reduce the force required to close a clamp.

22. Another objective of this invention is that it employ a cam operating feature such that pulling on one joint activates the other.

23. Another objective of this invention is that the pair of jaws bear time displaced unequal pressure.

Other objectives of this invention reside in its simplicity, elegance of design, ease of manufacture, service and use and even aesthetics as will become apparent from the following brief description of the drawings and concomitant description.

BRIEF DESCRIPTION OF THE DRAWINGS a). FIG. 1 is a three dimensional perspective view of the decoration making machine of this invention comprising a pair of jaws operable on a plurality of U shaped clips one at a time on a wire frame.

b) FIG. 2 is a three dimensional perspective view of decoration making machine of this invention but without the operand wire frame.

c). FIG. 3 is a top elevation of FIG. 2 d) FIG. 4 is an exploded three dimensional perspective view of decoration making machine of this invention.

e) FIG. 5 is a closeup 3D perspective view of the pair of jaws of this invention.

f) FIG. 6(*a*) shows wire frame in the form of an arch g) FIG. 6(*b*) shows wire frame in the shape of heart, the sign of love.

h) FIG. 6(*c*) shows a swag frame with only 3 clips j) FIG. 6(*d*) shows wire frame in the shape of ever popular Christmas candy cane.

k) FIG. 6(*e*) shows wire frame in the shape of a star.

l) FIG. 6(*f*) shows wire frame in the shape of a wave or garland.

DETAILED DESCRIPTION OF THE PREFERRED EMBODIMENT

Figure 1:
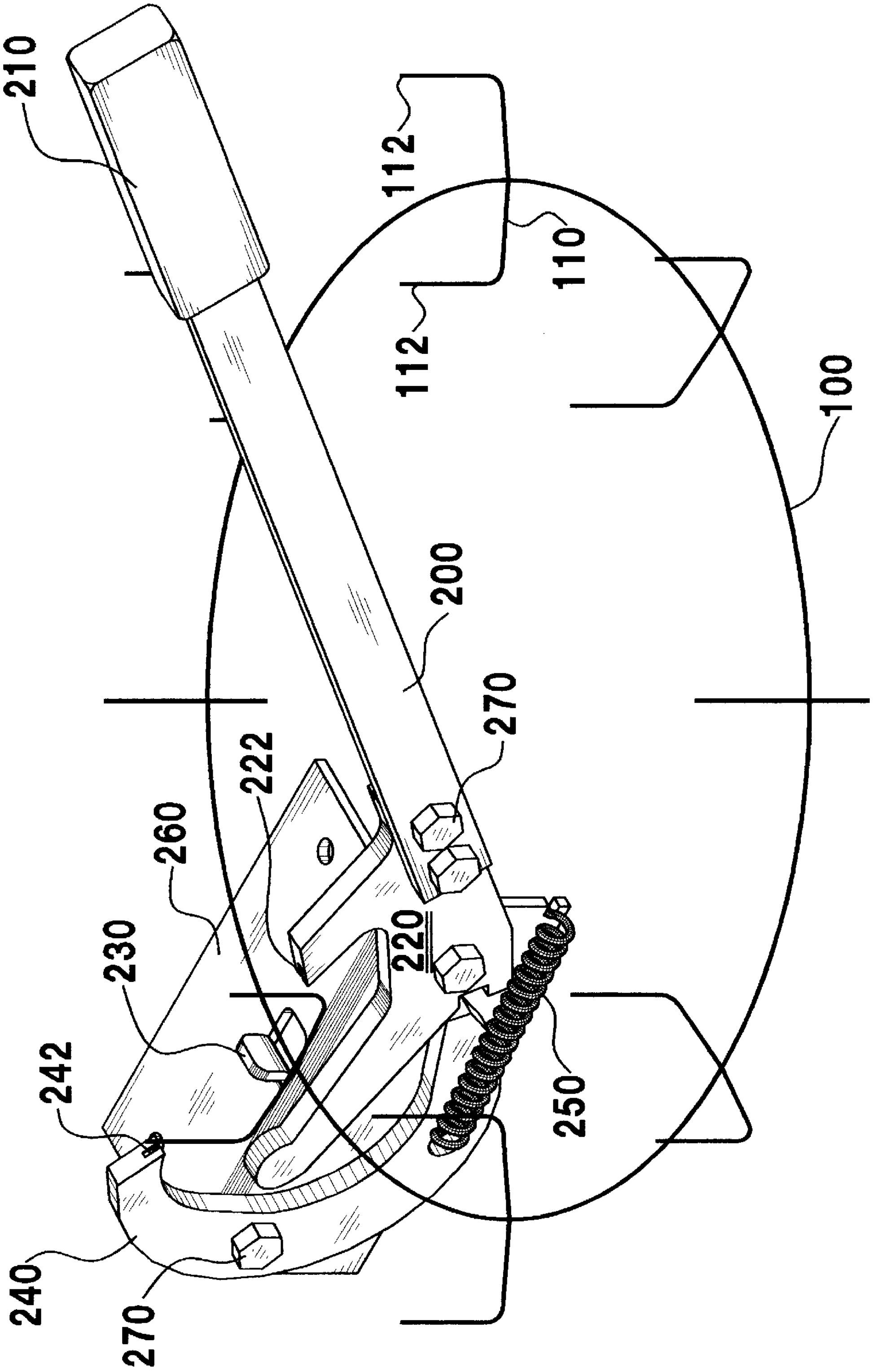
Figure 2:
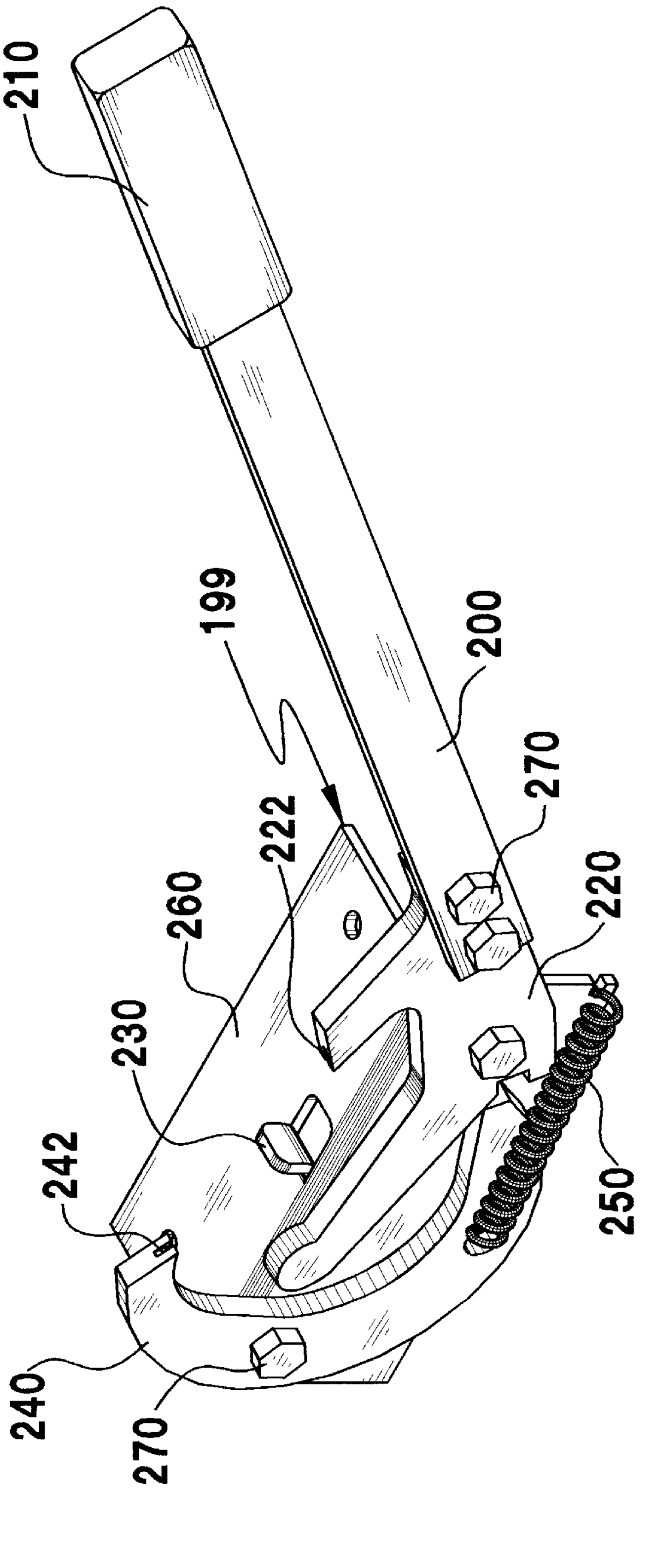
Figure 3:
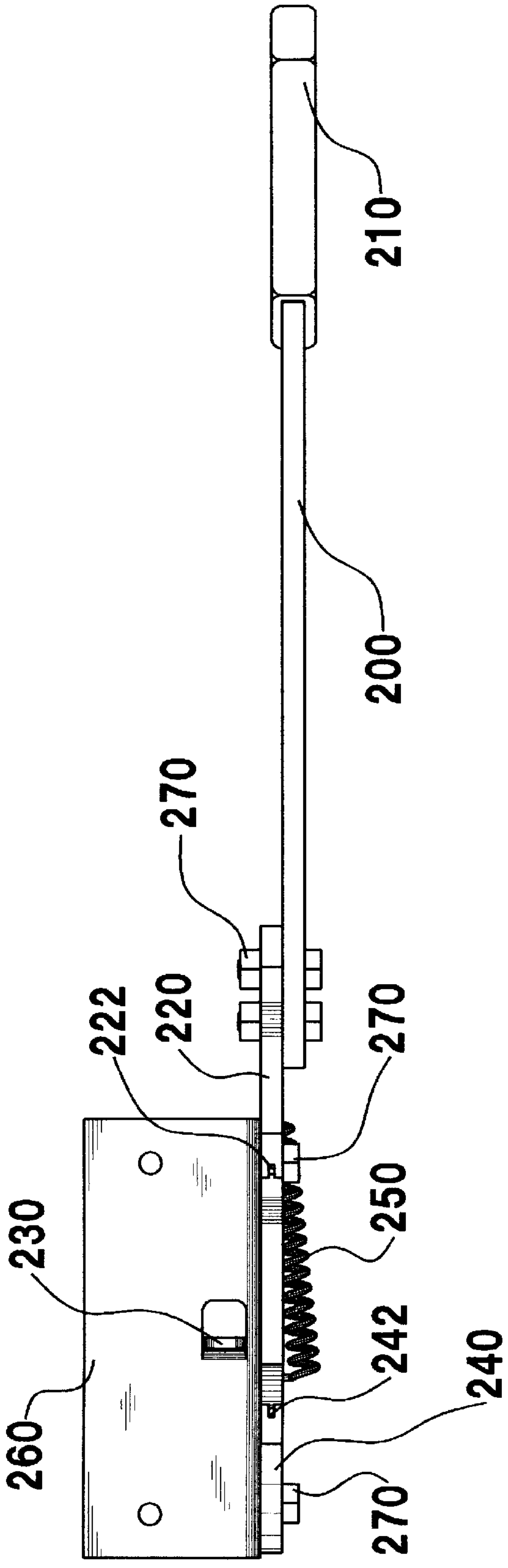
Figure 4:
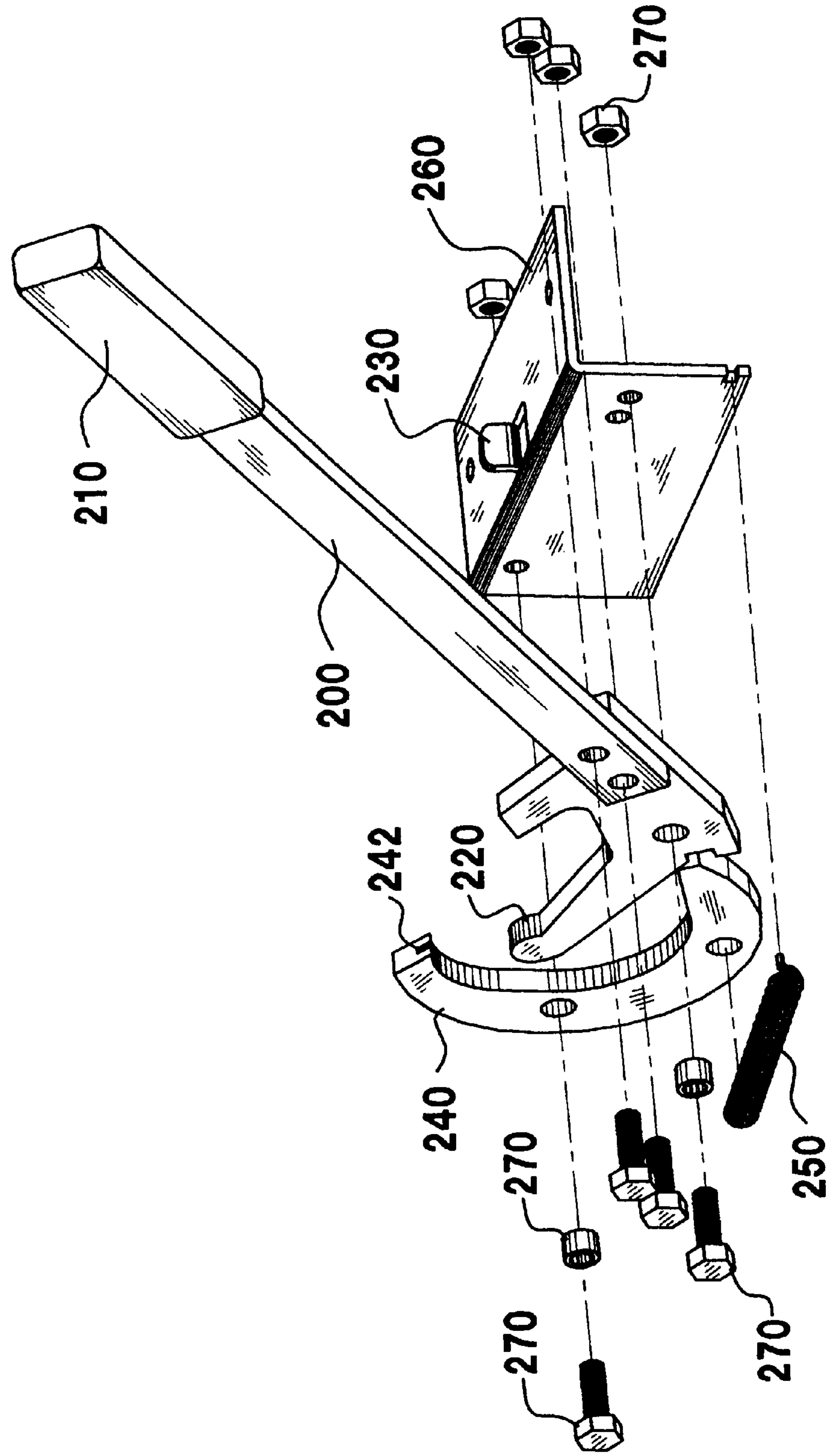
Figure 5:
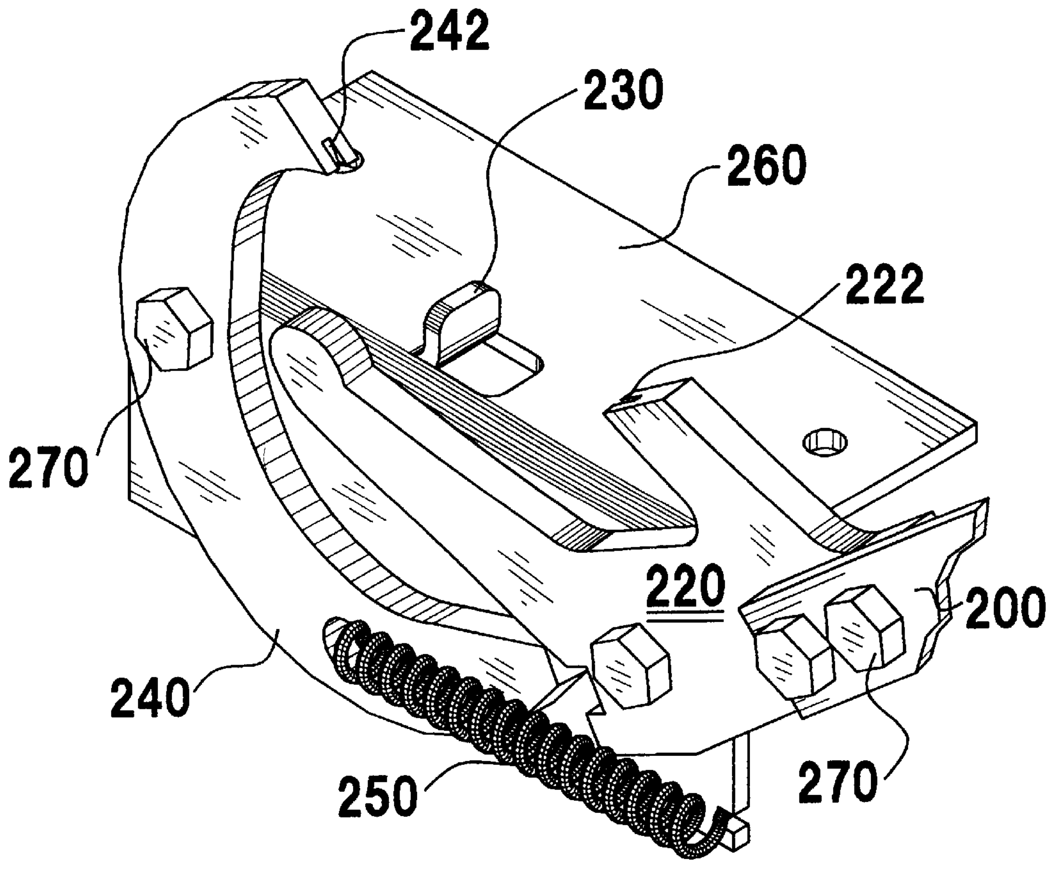

The multipurpose versatile decoration making system of this invention as shown in the drawings wherein like numerals represent like parts throughout the several views, there is generally disclosed in FIG. 1 a wire frame 100 having a plurality of U shaped clips 110 made of low carbon steel and a machine 199 which in turn comprises an F shaped jaw member 220 and a C shaped jaw member 240 coupled and engaged into each other as a cam action, such that when a handle 200 connected to F shaped member is pulled, the F shaped jaw member 220 forces the C shaped jaw member to close with it all be it with a slight time lag.

The machine 199 binds plurality of decoration members such as lightly trimmed greens or arborvitae (not shown) along a wire frame 100 by clamping down U shaped members 110 mounted along the wire frame 100 where the F shaped jaw 220 slides inside the C shaped jaw 240 in a camming action to close the U shaped members 110 successively spaced along the wire frame 100 over the decoration greens such as lightly trimmed arborvitae.

A return spring 250 facilitates automatic return of the handle to initial position, which handle 200 also has a grip or handle cover 210 to avoid blisters or even uncomfortable pressure on the palm even without gloves particularly when used by women and children.

The machine 199 is mounted on the edge of a work surface such as a table.

OPERATION

The cam action jaws 220, 240 are engaged in such a manner that the C shaped jaw 240 contacts a prong 112 of U shaped clip 110 on wire frame 100 at a point higher and therefore earlier in time. This in turn reduces the pressure needed to close the U shaped clip or clamp 110 even when used by women and children. After a certain angle of upward bend is accomplished by C shaped jaw 240, the bent outer prong 112 begins to slide under the very jaw 240 that is pushing it inward. This is because after bending over so many degrees, the outer prong 112 is low enough and angled away so as to slide under the C shaped jaw 240 and thus the entire wire frame clamp 100 starts to move towards the C shaped jaw 240 until stopped by tab 230 and further pulling forward and down of the handle by the operator towards the operator now begins to close the inner distal prong 112' as well, until both prongs 112 & 112' of the U shaped clip 110 are tightly closed over the stems of the greens.

USE

The use and operation of this device by a consumer is simple and even intuitive. The device is installed on a work surface such as a table with mounting bracket 260 and concomitant mounting fastener hardware 270. The inventor recommends the following steps.

a) Hold the clamp snugly inside the jaws such that a U clip is aligned along the notch 242 of C shaped jaw 240 and notch 222 of F shaped jaw 220.

b) Place and align desired quantity of lightly trimmed greens or other decorative filler materials with stems between one or more U shaped clips 110 along the wire frame 100 c) Pull the lever handle ensuring that the hand and fingers are out of the reach of the jaws.

It should be noted that the outer prong closes first and when the clamp hits the tab 230, the inner prong closes by further and continued pulling of the handle by the consumer hobbyist.

d) Align next U clip and repeat steps a) through c) supra until all clips are closed.

e) Remove the wreath and trim lightly if necessary and desirable.

f) Add any other decorations such as bow, cones, miniatures and the like to suit the season and the tastes of the consumer.

It should be noted that the diameter of the finished wreath is considerably and proportionately larger than the diameter of the clamp wire frame.

The inventor has given a non-limiting description of the concept. Many changes may be made to this design without deviating from the spirit of this invention. Examples of such contemplated variations include the following:

1. The shape and size of the various members and components may be modified.

2. The color, aesthetics and materials may be enhanced or varied.

3. Instead of a mechanical interface an electrical interface may be employed.

4. Additional complimentary and complementary functions and features may be added.

5. A small motor may be attached to reduce the effort required on the part of the user.

6. Additional festive ornaments such as a bow, cones and other decorations may be added automatically.

7. The cam action of the two jaws may be replaced by scissor action under the work surface 8. Unequal nonconcurrent pressure on the jaws may be applied by some other means 9. The machine may be particularly adapted to create decorations in the shape of letters, slogans and logos and other symbols and designs.

10. A more economical version of the device may be adapted with an informational or advertising message for promotional give aways.

Other changes such as aesthetics and substitution of newer materials as they become available, which substantially perform the same function in substantially the same manner with substantially the same result without deviating from the spirit of the invention may be made.

Following is a listing of the components uses in this embodiment arranged in ascending order of the reference numerals for ready reference of the reader.

100=Wire frame generally or circular wire frame
110=U shaped clips
112=An outer prong of U shaped clip on wire frame 100 positioned nearest to the operator.
112'=An inner or distal prong of U shaped clip on wire frame 100 positioned opposite the outer prong 112
120=Wire frame in the shape of an arch
130=Heart shaped wire frame
140=Short vertical straight line swag wire frame with only 3 clips.
150=Wire frame in the shape of a candy cane
160=Wire frame in the shape of a Jewish star
170=Garland Flexible Wire garland frame in the shape of wave
199=Machine generally
200=Handle
210=Grip on handle or handle cover
220=F shaped Jaw Member
222=Notch on F Jaw member
230=Tab stop member
240=C shaped Jaw Member
242=Notch on "C" jaw member
250=Spring
260=Mounting Bracket
262=Notch on Mounting Bracket
270=Fastener hardware
275=Recess or hole to accommodate fastener hardware

DEFINITIONS AND ACRONYMS

A great care has been taken to use words with their conventional dictionary definitions. Following definitions are included here for clarification.

3D.=Three Dimensional

Arborvitae=A type of cedar greens

DIY=Do It Yourself

ID=Internal Diameter or diameter of the circular wire frame generally

Integrated=Combination of two entities to act like one

Interface=Junction between two dissimilar entities

OD=Outer Diameter of the finished wreath

Swag=Short vertical straight line swag wire frame with only 3 clips.

Symmetrical=The shape of an object of integrated entity which can be divided into two along some axis through the object or the integrated entity such that the two halves form mirror image of each other.

While this invention has been described with reference to illustrative embodiments, this description is not intended to be construed in a limiting sense. Various modifications and combinations of the illustrative embodiments as well as other embodiments of the invention will be apparent to a person of average skill in the art upon reference to this description. It is therefor contemplated that the appended claim(s) cover any such modifications, embodiments as fall within the true scope of this invention.

The inventor claims:

1. A multipurpose versatile decoration making machine including means for clamping decorative matter along a wire frame comprising:

a) an F shaped jaw member;

b) a handle connected to said F shaped jaw member;

c) a C shaped jaw member engaged with said F shaped jaw (in a cam action) member such that said F shaped jaw member slides against said C shaped jaw member in a camming action when said handle connected to said F shaped jaw member is pulled down; and d) a means for mounting said machine on to a work surface connected to said F shaped Jaw member and said C shaped jaw member.

2. The multipurpose versatile decoration making machine of claim 1 wherein said means for mounting said machine comprises a right angled bracket and said F shaped jaw member has a notch and said C shaped jaw member has a notch.

3. The multipurpose versatile decoration making machine of claim 2 wherein said F shaped jaw member and said C shaped Jaw member are designed to receive a wire frame clamp with plurality of equally spaced U shaped clips having an outer prong and a distal inner prong.

4. The multipurpose versatile decoration making machine of claim 3 wherein one of said U shaped clips is aligned along said notch of said C shaped jaw member and said notch of said F shaped Jaw member.

5. The multipurpose versatile decoration making machine of claim 4 wherein said right angled bracket includes a tab stop for stopping said wire frame clamp.

6. The multipurpose versatile decoration making machine of claim 5 wherein pulling of said handle causes said outer prong of said wire frame clamp to close before closing of said distal inner prong of said wire frame clamp.

7. The multipurpose versatile decoration making machine of claim 6 wherein said wire frame clamp is made of high carbon content rigid steel.

* * * * *